United States Patent
Trevethan (10) Patent No.: US 12,034,865 B2
(45) Date of Patent: Jul. 9, 2024

(54) SECURE DYNAMIC THRESHOLD SIGNATURE SCHEME EMPLOYING TRUSTED HARDWARE

(71) Applicant: nChain Licensing AG, Zug (CH)

(72) Inventor: Thomas Trevethan, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 17/576,779

(22) Filed: Jan. 14, 2022

(65) Prior Publication Data

US 2022/0247572 A1    Aug. 4, 2022

Related U.S. Application Data (63) Continuation of application No. 16/611,201, filed as application No. PCT/IB2018/052885 on Apr. 26, 2018, now Pat. No. 11,228,447.

(30) Foreign Application Priority Data

May 5, 2017    (GB) ..................................... 1707168

(51) Int. Cl.
   *H04L 29/06*        (2006.01)
   *H04L 9/08*         (2006.01)
   (Continued)

(52) U.S. Cl.
   CPC ............ *H04L 9/3252* (2013.01); *H04L 9/085* (2013.01); *H04L 9/3239* (2013.01);
   (Continued)

(58) Field of Classification Search
   None
   See application file for complete search history.

(56) References Cited

U.S. PATENT DOCUMENTS

| | | | |
|---|---|---|---|
| 5,625,692 A | | 4/1997 | Herzberg et al. |
| 7,593,527 B2 * | | 9/2009 | Beeson ................. H04L 9/3066 |
| | | | 713/180 |

(Continued)

FOREIGN PATENT DOCUMENTS

| | | | |
|---|---|---|---|
| WO | 2015160839 A1 | 10/2015 | |
| WO | 2016105927 A1 | 6/2016 | |

OTHER PUBLICATIONS

International Search Report and Written Opinion dated Jul. 31, 2018, Patent Application No. PCT/IB2018/052885, 10 pages.
(Continued)

*Primary Examiner* — Maung T Lwin
(74) *Attorney, Agent, or Firm* — Davis Wright Tremaine LLP (57) ABSTRACT

Embodiments of the invention provide enhanced security solutions which are enforced through the use of cryptographic techniques. It is suited for, but not limited to, use with blockchain technologies such as the Bitcoin blockchain. Methods and devices for generating an elliptic curve digital signature algorithm signature (r, w) are described. In one embodiment, a method includes: i) forming, by a node, a signing group with other nodes; ii) obtaining, by the node, based on a secure random number: a) a multiplicative inverse of the secure random number; and b) the first signature component, r, wherein the first signature component is determined based on the secure random number and an elliptic curve generator point; iii) determining, by the node, a partial signature based on a private secret share, the multiplicative inverse of the secure random number and the first signature component; iv) receiving, by the node, partial signatures from other nodes of the signing group; and v) generating, by the node, the second signature component, w, based on determined and received partial signatures.

12 Claims, 6 Drawing Sheets

(51) Int. Cl.
*H04L 9/32* (2006.01)
*H04L 9/00* (2022.01)

(52) U.S. Cl.
CPC .............. *H04L 9/3255* (2013.01); *H04L 9/50* (2022.05); *H04L 2209/127* (2013.01)

(56) References Cited

U.S. PATENT DOCUMENTS

| | | | |
|---|---|---|---|
| 7,869,593 B2 | 1/2011 | Beeson | |
| 7,936,869 B2 | 5/2011 | Beeson | |
| 8,009,829 B2* | 8/2011 | Jueneman | H04L 9/3236 380/278 |
| 8,139,763 B2* | 3/2012 | Boscher | H04L 9/302 726/2 |
| 8,938,615 B2* | 1/2015 | Neill | H04L 9/3252 713/168 |
| 9,009,481 B2 | 4/2015 | Muir et al. | |
| 9,489,522 B1 | 11/2016 | El Defrawy et al. | |
| 2002/0152385 A1 | 10/2002 | Vanstone et al. | |
| 2005/0268103 A1* | 12/2005 | Camenisch | H04L 9/3234 713/176 |
| 2006/0153364 A1* | 7/2006 | Beeson | H04L 9/3252 380/30 |
| 2006/0156012 A1* | 7/2006 | Beeson | H04L 9/3066 713/180 |
| 2006/0156013 A1 | 7/2006 | Beeson | |
| 2007/0064931 A1* | 3/2007 | Zhu | G06F 7/725 380/30 |
| 2009/0262930 A1* | 10/2009 | Lambert | G06F 7/725 380/46 |
| 2012/0166795 A1* | 6/2012 | Wood | G06F 21/57 713/189 |
| 2012/0233469 A1 | 9/2012 | Vanstone et al. | |
| 2012/0278628 A1* | 11/2012 | Chen | G06F 21/64 713/176 |
| 2013/0073867 A1 | 3/2013 | Lambert | |
| 2013/0195274 A1* | 8/2013 | Nakashima | H04L 9/3006 380/282 |
| 2016/0344557 A1* | 11/2016 | Chabanne | H04L 9/3066 |
| 2017/0109735 A1 | 4/2017 | Sheng et al. | |
| 2017/0353319 A1* | 12/2017 | Scarlata | G09C 1/00 |
| 2018/0145836 A1 | 5/2018 | Saur et al. | |
| 2018/0167203 A1* | 6/2018 | Belenko | H04L 9/14 |
| 2018/0211067 A1* | 7/2018 | Costa | H04L 9/3247 |

OTHER PUBLICATIONS

Nakamoto, "Bitcoin: A Peer-to-Peer Electronic Cash System," Bitcoin, Oct. 31, 2008, https://bitcoin.org/bitcoin.pdf, 9 pages.
Sahoo et al., "An Elliptic-Curve-Based Hierarchical Cluster Key Management in Wireless Sensor Network," Proceedings of the International Conference on Advanced Computing, Networking, and Informatics, Jun. 2013, https://pdfs.semanticscholar.org/8ee7/e5d22dcee55fe9e553d1f629fc02cdb4801d.pdf, 10 pages.
UK Commercial Search Report dated Jun. 23, 2017, Patent Application No. GB1707168.9, 6 pages.
UK IPO Search Report dated Oct. 17, 2017, Patent Application No. GB1707168.9, 6 pages.
Wang et al., "Group Authentication and Group Key Distribution for Ad Hoc Networks," International Journal of Network Security, 17(2):199-207, Mar. 2015, https://pdfs.semanticscholar.org/a8ed/69bbba47a702190680614c4c61b0b5bcf325.pdf.
Antonopoulos, "Mastering Bitcoin—Unlocking Digital Cryptocurrencies," O'Reilly Media, Inc., Dec. 20, 2014, 282 pages.
Satoshi et al., "Connection Limits," Bitcoin Forum, Aug. 9, 2010, https://bitcointalk.org/index.php?topic=741.0;prev_next=prev, 2 pages.
Gennaro et al., "Threshold-Optimal DSA/ECDSA Signatures and an Application to Bitcoin Wallet Security," retrieved from https://eprint.iacr.org/2016/013.pdf, 2016, 42 pages.

* cited by examiner

SECURE DYNAMIC THRESHOLD SIGNATURE SCHEME EMPLOYING TRUSTED HARDWARE

CROSS REFERENCE TO RELATED APPLICATIONS

This application is a continuation of U.S. patent application Ser. No. 16/611,201, filed Nov. 5, 2019, entitled "SECURE DYNAMIC THRESHOLD SIGNATURE SCHEME EMPLOYING TRUSTED HARDWARE," which is a 371 National Stage Patent Application of International Patent Application No. PCT/IB2018/052885, filed Apr. 26, 2018, entitled, "SECURE DYNAMIC THRESHOLD SIGNATURE SCHEME EMPLOYING TRUSTED HARDWARE," which claims priority to United Kingdom Patent Application No. GB1707168.9, filed May 5, 2017, entitled "COMPUTER-IMPLEMENTED SYSTEM AND METHOD," the disclosures of which are incorporated herein by reference in their entirety.

TECHNICAL FIELD

This invention relates generally to computer-implemented security techniques, including the use of cryptographic signatures to secure, and enforce the security of, resources that are exchanged or transmitted via a computer network. It also relates to distributed ledger (blockchain) technology, and more particularly to methods and systems for providing decentralized control over exchanges and/or transfers that are associated with and/or performed via a digital ledger. The invention is particularly suited, but not limited to, allowing a threshold number of members of a group to generate a valid cryptographic signature on behalf of that group.

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Some network nodes act as miners and perform work to ensure that each transaction is valid, with invalid transactions rejected from the network. For example, software clients installed on the nodes perform this validation work on transactions that reference unspent transaction outputs (UTXO). Validation may be performed by executing a transaction's locking and unlocking scripts. If execution of the locking and unlocking scripts evaluate to TRUE and, if certain other conditions are met, the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e. added to the public ledger of past transactions. The transaction is considered to be confirmed when a sufficient number of blocks are added to the blockchain to make the transaction practically irreversible.

Blockchain protocols sometimes provide for multi-party signing features that require signatures from a number of nodes or parties before removing an encumbrance on an unspent output (UTXO). For example, Bitcoin's multisig feature provides such functionality. Multi-signature scripts may set a condition in which N public keys are recorded in a locking script and at least M private keys, each associated with a respective one of the N public keys, must provide signatures to release an encumbrance i.e. to unlock the UTXO. Such signature schemes offer advantageous security benefits and provide enhanced control over the UTXO by enabling a more granular and sophisticated degree of control over locking/unlocking of the UTXO. However, known multi-sig techniques offer limited functionality since they do not allow the parties who must contribute to signature generation to change after the locking script is configured. Therefore, there is a need for improved security mechanisms for controlling electronic resources such as those transferred via blockchain and other networks.

Thus, in accordance with the present invention there is provided a method as defined in the appended claims.

As will be described in greater detail below, a dynamic multiparty threshold signature scheme allows control of a resource (e.g. a blockchain transaction output, UTXO) to be shared among a group of participants under a single public key but with each group member holding a private secret. A threshold subset of the participants are required to collectively sign in order to spend the output. Advantageously, a digital signature scheme is described that allows a valid signature to be generated without requiring any of the participants who contribute to signature generation to reveal their respective private secrets. Trusted execution environments may be used to offer security to the threshold signature scheme.

Advantageously, techniques are described for enrolling and disenrolling participants in a manner that allows the single public key that is used for the group to remain the same. Trusted execution environments are used to enable secure modification to group members without having to change the single public key for the group.

Therefore, in accordance with the invention there may be provided a computer-implemented method. It may be described as a security or control method. It may be arranged to secure or control a resource. It may be arranged to control access to the resource. The controlled resource may be an electronic resource, entity or item stored on or transmitted via a computer or network. It may be, in some cases, referred to as a "digital asset", an "output", "a portion of cryptocurrency", and/or a "UTXO". The invention may be arranged to control access to and/or transfer of the resource. The invention may be arranged to lock or unlock access to/control of the resource. In some cases, the term "spend" may be used to refer to unlocking of the resource i.e. permitting control of or access to it.

The method may be a cryptographically-enforced method. Additionally or alternatively, it may be described as a method for generating an elliptic curve digital signature algorithm signature. The signature may comprise a first signature component, r, and a second signature component, w. The method may be implemented by one or more nodes in a network such as, for example, a blockchain network.

The method may include: i) forming, by a node, a signing group with other nodes; ii) obtaining, by the node, based on a secure random number: a) a multiplicative inverse of the secure random number; and b) the first signature component, r, wherein the first signature component is determined based on the secure random number and an elliptic curve generator point; iii) determining, by the node, a partial signature based on a private secret share, the multiplicative inverse of the secure random number and the first signature component; iv) receiving, by the node, partial signatures from other nodes of the signing group; and v) generating, by the node, the second signature component, w, based on determined and received partial signatures.

The method may comprise the step of using the signature to control access to and/or transfer of a resource over a computer-implemented network. This may be a blockchain network.

In some implementations, obtaining includes generating the multiplicative inverse and the first signature component. The method may also include sending the multiplicative inverse to the other nodes.

In some implementations, obtaining includes provisioning an enclave associated with a trusted execution environment (TEE) of the node to generate the secure random number.

In some implementations, obtaining comprises receiving the multiplicative inverse and the first signature component from one of the other nodes.

In some implementations, the method includes, prior to forming the signing group, signalling an intention to participate in distributed signature generation.

In some implementations, the partial signature is determined within an enclave associated with a trusted execution environment of the node.

In some implementations, the partial signature is determined by performing Lagrangian interpolation.

In some implementations, the second signature component is generated within an enclave associated with a trusted execution environment and the method further includes, after generating the second signature component, sending the elliptic curve digital signature algorithm from the enclave to a host portion of the node.

In some implementations, the method further includes adding the signature to a blockchain transaction and broadcasting it to a blockchain network.

In some implementations, the method further includes, prior to forming the signing group, obtaining the secret share by based on secret share data received from a plurality of existing members of a group.

In some implementations, the secret share is determined within an enclave associated with a trusted execution environment of the node.

In some implementations, the partial signature, $v_i$, is determined as:

$$v_i = k^{-1} r b_i s_i \bmod p,$$

where $b_i$ is a Lagrangian interpolation coefficient, $k^{-1}$ is the multiplicative inverse of the secure random number, $s_i$ is the secret share, r is the first signature component, and p is an order.

In accordance with the invention, there may be provided an electronic device. Any feature described above in relation to a method of the invention may also be applicable to a device arranged in accordance with the invention. The device may be arranged to implement or execute any embodiment of the method described above. The electronic device may include an interface device, a processor coupled to the interface device and a memory coupled to the processor. The memory may have stored thereon computer executable instructions which, when executed, configure the processor to perform a method described herein.

In accordance with the invention, there may be provided a computer readable storage medium. The computer readable storage medium includes computer-executable instructions which, when executed, configure a processor to perform a method described herein.

These and other aspects of the present invention will be apparent from and elucidated with reference to, the embodiment described herein. An embodiment of the present invention will now be described, by way of example only, and with reference to the accompany drawings, in which:

The invention relates to improved security solutions. These can be used for the enhanced security of controlled resources on a computer network. In the following illustrative embodiment, we use a blockchain network, e.g. Bitcoin, as our example network. Blockchains can be used to transfer control of an electronic resource such as a token or a portion of cryptocurrency, between nodes on the network. For convenience only, we may refer below to the controlled resource as a "digital asset". However, this should not be taken to be limiting in any regard, and should not be interpreted as meaning an asset of any particular type. The invention has benefits and applications beyond that of blockchain transactions, and is not limited for use in relation to financially-oriented contexts, but has a broader applicability. The blockchain example provided below is only provided for illustration.

Blockchain Network

Figure 1:
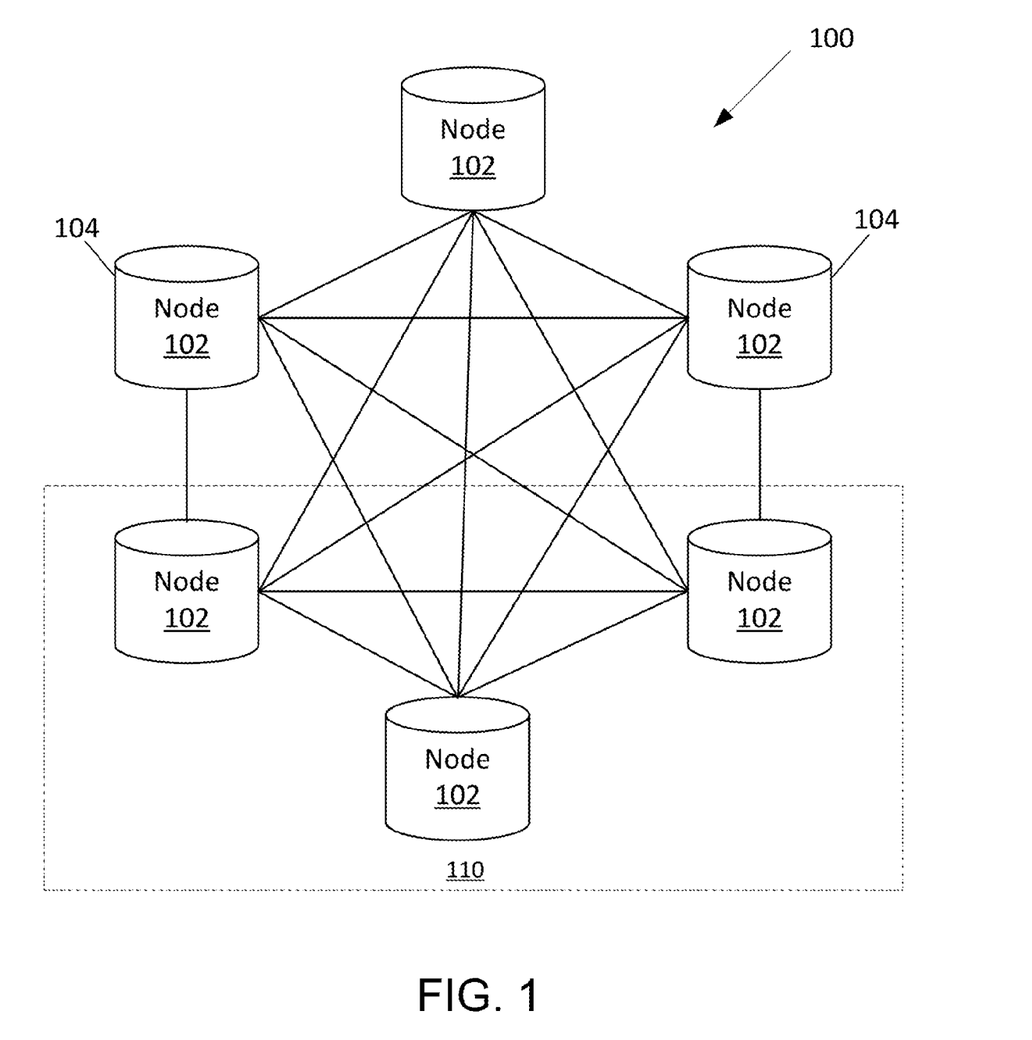
FIG. 1 illustrates a block diagram of an example blockchain network.

Reference will first be made to FIG. 1 which illustrates, in block diagram form, an example blockchain network 100 associated with a blockchain. The blockchain network may be a public blockchain network, which is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

Nodes 102 of the blockchain network 100 are coupled to one another using suitable communication technologies which may include wired and wireless communication technologies. Such communication adheres to the protocol associated with the blockchain. For example, where the blockchain is a bitcoin blockchain, the bitcoin protocol may be used.

Nodes 102 maintain a (possibly global) ledger of all transactions on the blockchain. The ledger is a de-centralised, distributed ledger. Each node 102 may store a complete copy or a partial copy of the global ledger. In the case of a blockchain secured by proof-of-work, transactions by a node 102 affecting the global ledger are verified by other nodes 102 so that the validity of the global ledger is maintained. When the blockchain is a proof-of-work based blockchain, blocks are also verified by checking the proof-of-work submitted with the block.

At least some of the nodes 102 operate as miners 104 of the blockchain network 100. The blockchain network 100 of FIG. 1 is a proof-of-work block chain in which miners 104 perform expensive computations in order to facilitate transactions on the blockchain. For example, the proof-of-work blockchain may require miners to solve a cryptographic problem. In Bitcoin the miners 104 find a nonce such that a block header hashes, with SHA-256, to a number that is less than a value defined by the current difficultly. The hashing power required for the proof-of-work algorithm means that a transaction is considered practically irreversible after a certain number of blocks have been mined on top of it. A miner 104 who solves the cryptographic problem creates a new block for the blockchain and broadcasts the new block to other nodes 102. The other nodes 102 verify that the miner 104 has, in fact, solved the cryptographic problem and has, therefore, demonstrated sufficient proof-of-work before accepting that the block should be added to the blockchain. The block is added to the blockchain (i.e., to the distributed global ledger) by consensus of the nodes 102.

The block created by the miner 104 includes transactions (TXs) which had been broadcast to the block chain by nodes 102. For example, the block may include transactions from an address associated with one of the nodes 102 to an address associated with another of the nodes 102. In this way, the block serves as a record of a transfer from one address to another. The party which requested that the transaction be included in the block proves that they are authorized to initiate the transfer (e.g., in the case of Bitcoin, to spend the output) by signing the request using a private key corresponding to their public key. The transfer may only be added to the block if the request is validly signed.

In the case of Bitcoin, there is a one-to-one correspondence between public keys and addresses. That is, each public key is associated with a single address. Thus, any reference herein to transferring controlled resources (e.g. digital assets) to or from a public key (e.g., paying into the public key) and transferring digital assets to or from the address associated with that public key refer to a common operation.

Some of the nodes 102 may not operate as miners and may, instead, participate as validating nodes. Validation of transactions may involve checking signature(s), confirming reference to valid UTXO, etc.

The example of FIG. 1 includes six nodes 102, three of which are participating as miners 104. In practice, the number of nodes 102 or miners 104 may be different. In many blockchain networks, the number of nodes 102 and miners 104 may be much greater than the number illustrated in FIG. 1.

As will be explained below, various nodes 102 may cooperate to form a group 110 which may cooperatively generate a digital signature under a threshold signature scheme. In the example illustrated, three nodes 102 are shown as taking part in the group 110. However, the actual number of group 110 members may be much larger.

Techniques for joining, leaving and participating in a group 110 will be discussed in greater detail below.

Electronic Device Operating as A Node

Figure 2:
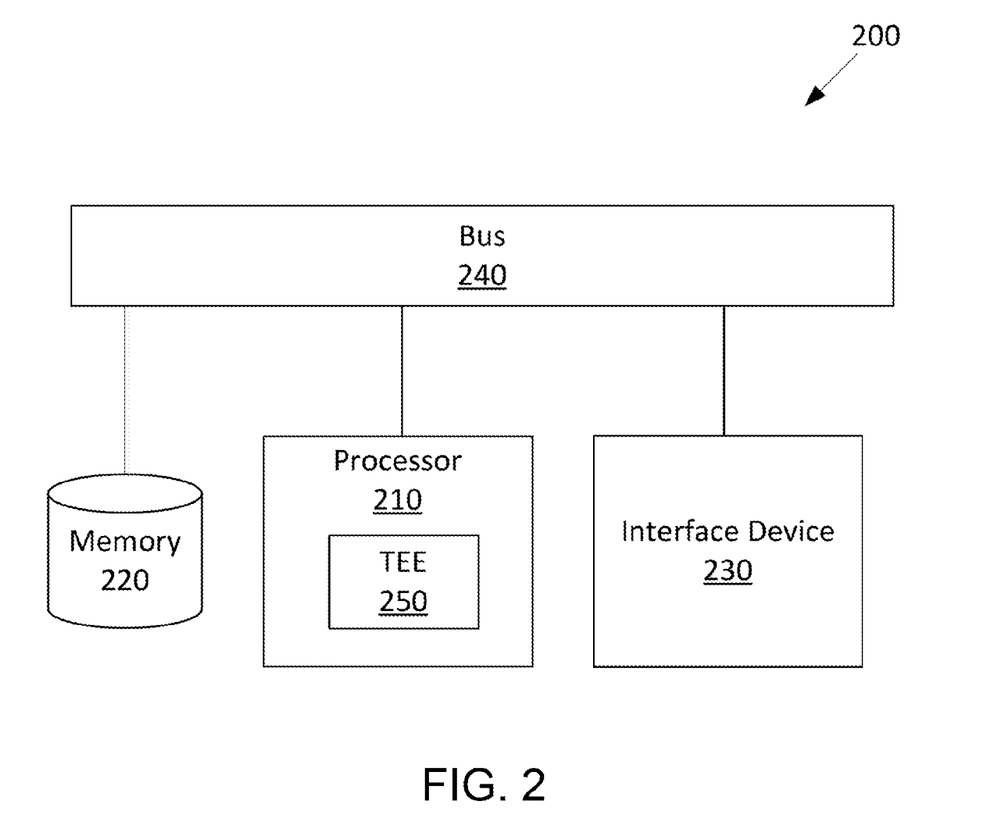
FIG. 2 illustrates a block diagram of an example electronic device which may function as a node in a blockchain network.

FIG. 2 is a block diagram illustrating components of an example electronic device 200 which may serve as a node 102 (FIG. 1) in a peer-to-peer blockchain network 100 (FIG. 1). The example electronic device 200 may also be referred to as a processing device. The electronic device may take various forms including, for example, a desktop computer, laptop computer, tablet computer, server, mobile device such a smartphone, wearable computer such as a smart watch, or a form of another type.

The electronic device 200 includes a processor 210, a memory 220 and an interface device 230. These components may be coupled directly or indirectly to one another and may communicate with one another. For example, the processor 210, memory 220 and interface device 230 may communicate with each other via a bus 240. The memory 220 stores a computer software program comprising machine-readable instructions and data for performing functions described herein. For example, the memory may include processor-executable instructions which, when executed by the processor 210, cause the electronic device to perform a method described herein. The processor-executable instructions may include instructions which, when executed by the processor 210, cause the electronic device to implement a protocol associated with the blockchain network 100 (FIG. 1). For example, the instructions may include instructions for implementing the Bitcoin protocol.

The memory 220 may store the global ledger of the blockchain network 100 (FIG. 1) or a portion thereof. That is, the memory 220 may store all blocks of the blockchain or a portion of the blocks, such as the most recent blocks, or a portion of the information in some blocks.

While the memory 220 is illustrated with a single block in FIG. 2, in practice the electronic device 200 may include multiple memory components. The memory components may be of various types including, for example, RAM, HDD, SSD, flash drives, etc. Different types of memory may be suited to different purposes. Further, while the memory 220 is illustrated separately from the processor 210, the processor 210 may include embedded memory.

As illustrated in FIG. 2, the processor 210 may include a secure area such as a Trusted Execution Environment (TEE) 250. The TEE 250 is an isolated execution environment which provides additional security to the electronic device 200 such as isolated execution, integrity of Trusted Applications and asset confidentiality. The TEE 250 provides execution space which guarantees that the computer instructions and data loaded inside the TEE 250 are protected in terms of confidentiality and integrity. The TEE 250 may be used to protect the integrity and confidentiality of important resources, such as keys. The TEE 250 is implemented, at least in part, at a hardware level so that instructions and data executed within the TEE 250 are protected against access and manipulation from the rest of the electronic device 200 and from external parties such as the owner of the electronic device. The data and computations within the TEE 250 are secured from the party operating the node 102 that includes the TEE 250.

The TEE 250 may operate to instantiate an enclave and then add pages of memory one at a time, while cumulatively hashing. A similar operation may also be performed on a remote machine (which may be a developer machine or another machine) so that the remote machine determines and stores the hash that is expected. The contents of an enclave can, therefore, be verified by any remote machine to ensure that the enclave is running an approved algorithm. This verification may be performed by comparing hashes. When an enclave is fully built, it is locked down. It is possible to run the code in the TEE 250 and to send secrets to the code, but the code cannot be changed. A final hash may be signed by an attestation key and may be made available to a data owner to verify it before the data owner sends any secrets to the enclave.

Enclaves are physically secure from access via a host system's architecture, including the system memory, BIOS and operating system of the host system. Enclaves, therefore, allow for secure and verifiable execution of software on a remote computer that is owned and controlled by an untrusted party. The memory of a process running on an enclave is only accessible to that process and is only accessible when the enclave software is running. The memory contents are encrypted if they are transmitted from the enclave to either a remote computer or to the host system itself. The decryption of enclave data relies upon keys that are only available to code that hashes to a particular value. If the enclave code was modified, it would no longer have access to these keys. Therefore, the enclave code cannot be modified to access its data.

Further, the TEE 250 may enable remote attestation which may be used by a node 102 (FIG. 1) to prove to other nodes 102 that a TEE 250 is authentic and is running approved computer executable instructions for a protocol that is implemented by a group 110. Remote attestation may be provided by the TEE 250 by running a particular piece of code and sending a hash of the code, internal to the enclave, signed by an internal attestation key for the enclave. Effectively, remote attestation allows an enclave of a TEE 250 to prove to any remote system that the enclave is executing computer-executable instructions that hash to a particular value.

Remote attestation enables code running within a secure enclave to obtain a signed certificate from the enclave that the code is executing within that that enclave with a given hash of an enclave page cache. The hash of the enclave page cache may be referred to as a quote and the enclave page cache is a section of protected memory in which designated code and data exist during execution of such code.

The TEE 250 may be equipped with a secure random number generator, which is internal to an enclave of the TEE, which can be used to generate private keys, random challenges, or other random data. The TEE 250 may also be configured to read data from external memory and may be configured to write data to the external memory. Such data may be encrypted with a secret key held only inside the enclave. ("Random" may be interpreted herein as including "pseudo-random").

The TEE 250 may be implemented using Intel Software Guard Extensions (SGX), for example. SGX supports remote attestation. A third-party attestation service such as Intel Attestation Service (IAS) may certify that these signed statements originate from authentic CPUs conforming to the SGX specification.

The electronic device 200 acts as a node 102 (FIG. 1) in the blockchain network 100 (FIG. 1) and may join and otherwise take part in a group 110 (FIG. 1). As will be explained below, group members (which may also be referred to as participants or nodes herein), cooperate to generate a valid signature to unlock an encumbrance associated with a group public key.

Threshold Signatures

The group 110 may be a permissioned or non-permissioned group. The group 110 may be joined by any node 102 (FIG. 1) in the blockchain network 100 (FIG. 1) (i.e., by any node that monitors and stores at least a portion of the information in the blockchain).

The group 110 is associated with a public key which may be referred to as a group public key. This group public key may control access to and encumber resources such as tokens, cryptocurrency etc that are transferred to the group public key. For example, a locking script of a transaction may lock a resource using the group public key so that such resources cannot be transferred or "spent" without approval of the group 110.

The group 110 may operate according to a threshold signature scheme. More particularly, resources that are controlled (encumbered) by the group public key may be unlocked (i.e., the encumbrance may be removed) when at least a threshold number of nodes that are group members cooperate to generate a valid signature. The signature is valid under an elliptic curve digital signature algorithm (ECDSA). ECDSA is a cryptographic algorithm that is used in Bitcoin and other blockchain networks to ensure that resources can only be spent by their rightful owners and the threshold signature schemes described herein allow a valid ECDSA signature to be generated by a threshold number of nodes of a group.

To enable group members to cooperatively generate a valid signature, the member nodes hold distributively generated private secrets (i.e., private secrets that are generated at the nodes themselves). As will be described in greater detail below, these private secrets may be used to generate a valid signature for a transaction without a member node having to reveal their private secret to other member nodes. Thus, an improved security mechanism is provided for the control of access to a resource.

A threshold signature scheme that allows members nodes to join and leave the group without having to change a group public key will now be described. A plurality of nodes 102 (FIG. 1) in the blockchain network 100 (FIG. 1) may implement a threshold signature scheme protocol as described herein. Such nodes 102 may include computer-executable instructions stored in memory 220 (FIG. 2) which implement the threshold signature scheme protocol. Such instructions, when executed by a processor 210 (FIG. 2), cause a node 102 (such as an electronic device 200 of the type described with reference to FIG. 2) to perform one or more methods of the threshold signature scheme protocol. Such methods may include any one or combination of the methods 300, 400, 500 and 600 of FIGS. 3 to 6. The methods may be performed by a node cooperatively with other nodes associated with other group members.

Group Initialisation

Figure 3:
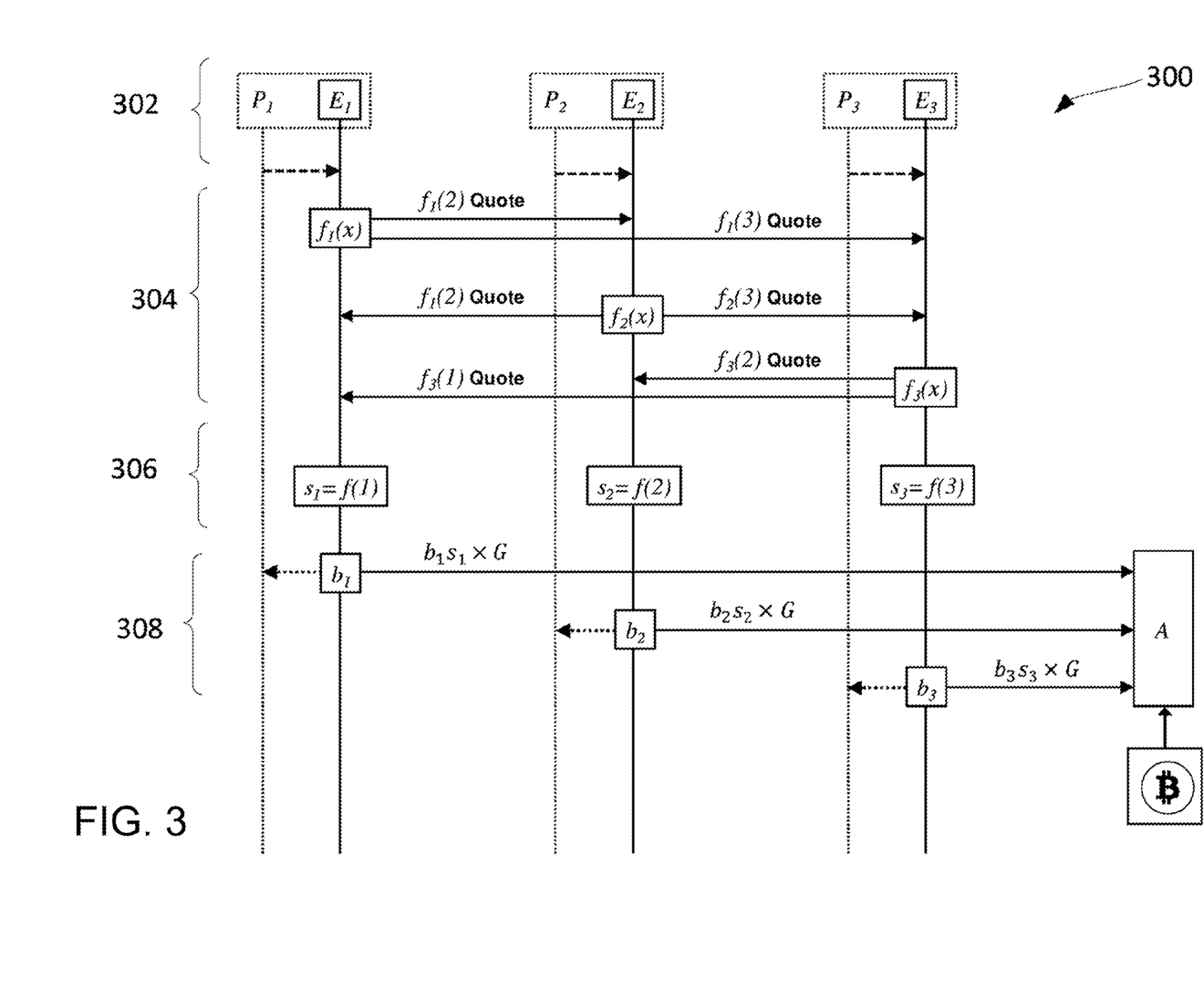
FIG. 3 is a signal diagram of a method of initializing a group.

Referring now to FIG. 3, a method 300 of initializing a group is illustrated. The group is initialized for use with a threshold signature scheme. That is, the group is initialized to allow member nodes to cooperatively generate a valid digital signature to remove an encumbrance of a digital asset. The encumbrance that is removed by the valid digital signature is an encumbrance that is based on the group public key.

FIG. 3 illustrates a method that is performed by a plurality of nodes, in cooperation with one another. More particularly, each node that is to be a group member performs the operations of the method 300 described below. These nodes may be referred to in the description which follows as participants, $P_i$ or members. Initially, a group, U, of n participants (i.e., i=1, 2, ..., n) are involved in performing the method 300. In the illustrated example, the group is formed by three nodes (i.e., n=3). However, a different number of nodes may be used to form the group. The nodes that perform the method 300 each include a certified TEE implementing an SGX enclave, $E_i$.

Prior to the method 300 being performed, the nodes 102 that are to form the group establish secure communication channels with one another and all agree on a signature threshold (t+1). Each node and enclave can privately communicate point-to-point after establishing secure channels (for example, using Diffie-Hellman exchange) and can also securely broadcast information to the other participants. The participants also collectively determine an elliptic curve generator point, G, and order p. Operations described below are performed using this elliptic curve generator point, G, and order p. For example, references to mod p describe modulo operations performed according to this order p. After communication setup, the nodes then perform dealer-free polynomial generation according to the method 300 described below.

At operation 302, each of the participants, $P_i$, provision their enclave, $E_i$, to generate a random degree t polynomial $f_i(x)$, where x is a variable of the polynomial function. A random degree t polynomial is a polynomial of degree t (in the integer finite field mod p) with each of the coefficients of the polynomial being randomly selected.

At operation 304, attestation is performed so that each enclave confirms to each of the other enclaves that they are running an approved initialization instruction set. During attestation, each enclave may send a quote to each of the other enclaves and each enclave, therefore, receives quotes from each of the other enclaves. Each of these received quotes are evaluated to determine whether the attestation is successful.

At operation 304, each enclave, $E_i$, securely sends points, $f_i(j)$ mod p, to each of the other enclaves $E_j$, where j=1, ... n. Accordingly, at operation 304, each enclave, $E_i$, received points from the other enclaves.

At operation 306, each enclave determines a secret share $s_i$. More particularly, at operation 306, each enclave, $E_i$ sums all the received points, $f_1(i)+f_2(i)+ \ldots +f_n(i)$ mod p, to determine a shared polynomial, f(x). That is, the shared polynomial is the sum of all of the participant's randomly generated polynomials. The secret share is then determined as $s_i=f(i)$ mod p which is the $P_i$ point on the polynomial f(x) mod p (i.e., the point where x=i), where $$f(x) = \sum_{k=0}^{t} a_k x^k$$

where $a_k$ are the coefficients of the terms of the polynomial ($a_0$ is a constant term and the shared secret), and x is the variable of the polynomial.

Thus, each secret share is determined as the sum of the points (i.e., the values) of all of other participant's random polynomials. Each participant only has a different point on the shared polynomial and so the polynomial (and shared secret ($a_0$) can be reconstructed (with interpolation) with t+1 points.

At operation 306, each secret share, $s_i$, is secured in its respective enclave, $E_i$. Each enclave, $E_i$ may also attest to the other of the enclaves that it has executed approved instructions in order to generate the secret share. Remote attestation may, therefore, be performed at operation 306 to ensure the secret share is appropriately generated.

Once secret shares are generated, a group public key (which is an elliptic curve public key) may be generated at operation 308. At operation 308, Lagrangian interpolation may be used to determine the group public key corresponding to the shared secret, $a_0$. More particularly, the participants, $P_i$ (where i=1, ..., t+1) of the group, U, each provision their enclaves $E_i$ to compute a respective public key share based on a Lagrangian interpolation coefficient, an elliptic curve generator point and their secret share. That is, the public key share may be computed as $b_i s_i \times G$, where $b_i$ is a Lagrangian interpolation coefficient determined as $$b_i = \prod_{j \in U, j \neq i} \frac{i}{j-i},$$

G is the elliptic curve generator point and $s_i$ is the secret share for participant, $P_i$ (i.e., it is the $P_i$ point on the shared polynomial).

During operation 308, the public key shares are broadcast by the participants to all other participants. Remote attestation may be used to confirm that the public key shares have been appropriately generated.

Upon receiving all of the public key shares (i.e., after receiving a public key share from each of the other participants), each participant may calculate a group public key, A, based on the received public key shares. More particularly, the group public key may be determined as the sum of all of the public key shares:

$$A = \sum_{i=1}^{t+1} b_i s_i \times G$$

Notably, the initialisation phase proceeds in a trustless manner and there is no single point of failure as there is no trusted dealer. Performing polynomial generation and subsequent processing within the enclaves protects the secret share which allows disenrollment (which will be described below with reference to FIG. 5) to remain secure.

Joining a Group after the Group has been Initiated

Figure 4:
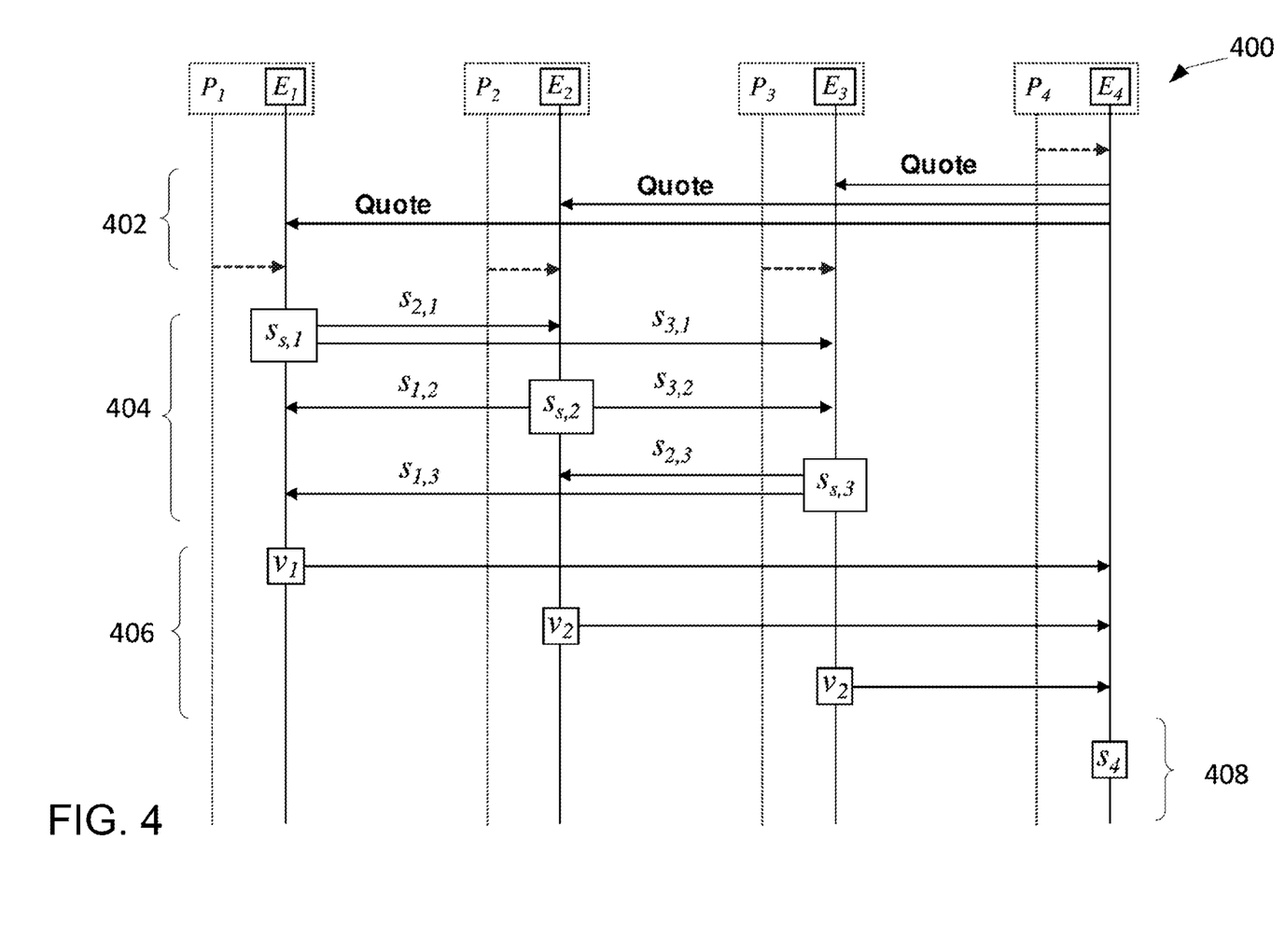
FIG. 4 is a signal diagram of a method of joining a group that has previously been initialized.

Referring now to FIG. 4, an enrolment method 400 is illustrated. The enrolment method 400 may be performed to allow a node to join a pre-existing group that has been initialized for use with a threshold signature scheme without having to issue a new group public key. The method 400 is performed after a group has already been initialized (such initialization may be in accordance with the method 300 of FIG. 3).

FIG. 4 illustrates a method that is performed by a plurality of nodes, in cooperation with one another. More particularly, nodes that are existing group members perform at least some operations of the method 400 described below and a prospective member performs at least some operations of the method 400. A prospective member (which may be designated $P_{n+1}$) is a node attempting to enrol in the group.

Prior to performance of the method 400, at least a threshold group of participants (t+1) signal to one another that they wish to enrol a prospective member. These participants form an enrolment group, $U_E$. The nodes that make up the enrolment group and the prospective member establish secure communication channels. The prospective member may also authenticate themselves to the nodes of the enrolment group.

In the example of FIG. 4, the enrolment group, $U_E$, includes three nodes (i.e., n=3). However, a different number of nodes may be used to form the enrolment group, as long as the number of nodes forming the enrolment group is at least the threshold (t+1) number of nodes. In the illustrated example, the prospective member, $P_{n+1}$ is denoted as $P_4$. The nodes that perform the method 400 each include a certified TEE implementing an SGX enclave, $E_i$.

At operation 402, the prospective member, $P_4$, provides an attestation quote to all members of the enrolment group, $U_E$, to confirm that the prospective member is running an authenticated protocol. This attestation quote is received by the enrolment group members and each of the enrolment group members evaluate the attestation quote to confirm that the prospective member is running an approved protocol.

At operation 404, the enrolment group members each split their own secret share, $s_i$, into parts. More particularly, each participant, $P_i$, where i=1, . . . , t+1, provisions their enclave $E_i$ to multiply their secret share, $s_i$, by the Lagrange interpolation coefficient determined with a new point (n+1). That is, a modified secret share, $s_i'$, may be determined as:

$$s_i' = s_i \times \prod_{j \in U, j \neq i} \frac{n+1-j}{i-j}$$

Each enclave $E_i$ then generates secure random numbers to split each $s_i'$ into t+1 portions (so that the sum of all such portions is $s_i'$), which may be referred to as secret share parts:

$$s_i' = s_{1,i} + s_{2,i} + \ldots + s_{t+1,i}$$

In FIG. 4, the subscript s (e.g., $s_{s,1}$) is used to indicate that the share $s_i$ has been split into t+1 parts.

Each enclave $E_i$ retains a secret share part, $s_{i,i}$, and exchanges the rest of the secret share parts with the other t enclaves of the enrolment group, $U_E$, such that each enclave $E_i$ then has the following secret share parts:

$$s_{i,1}, s_{i,2}, \ldots, s_{i,t+1}$$

Each enclave, $E_i$, then adds all the secret share parts received from all other members of $U_E$ to the secret share part, $s_{i,i}$, that was retained by that enclave, $E_i$, to obtain a secret share sum, $v_j$:

$$v_j = \sum_{i=1}^{t+1} s_{j,i}$$

At operation 406, each enclave, $E_i$, then sends secret share data to the prospective member's enclave, $E_{n+1}$. More particularly, at operation 406, each of the enrolment group participants, $P_i$, then provisions its associated enclave, $E_i$, to privately transmit this secret share sum, $v_j$, to the prospective member's enclave, $E_{n+1}$. The prospective member's enclave, $E_{n+1}$, receives these secret share sums from all of the enrolment group members and then (at operation 408) constructs a new secret share, $s_{n+1}$, by determining the sum all the received secret share sums:

$$s_{n+1} = \sum_{j=1}^{t+1} v_j$$

In the illustrated example, the new secret share is denoted $s_4$ since n is equal to 3.

Thus, the prospective member has obtained a new secret share based on secret share data received from a plurality of existing members of a group. More particularly, the prospective member has obtained a new secret share based on secret share data from at least a threshold of existing members of the group.

As an additional confirmation step, operation 308 of the method 300 may be performed after operation 406 of the method 400 to generate the group public key. The participants may then confirm that the group public key has not changed from its previous value (i.e., the value before the method 400 of FIG. 4 was performed).

Disenrollment From Group

Figure 5:
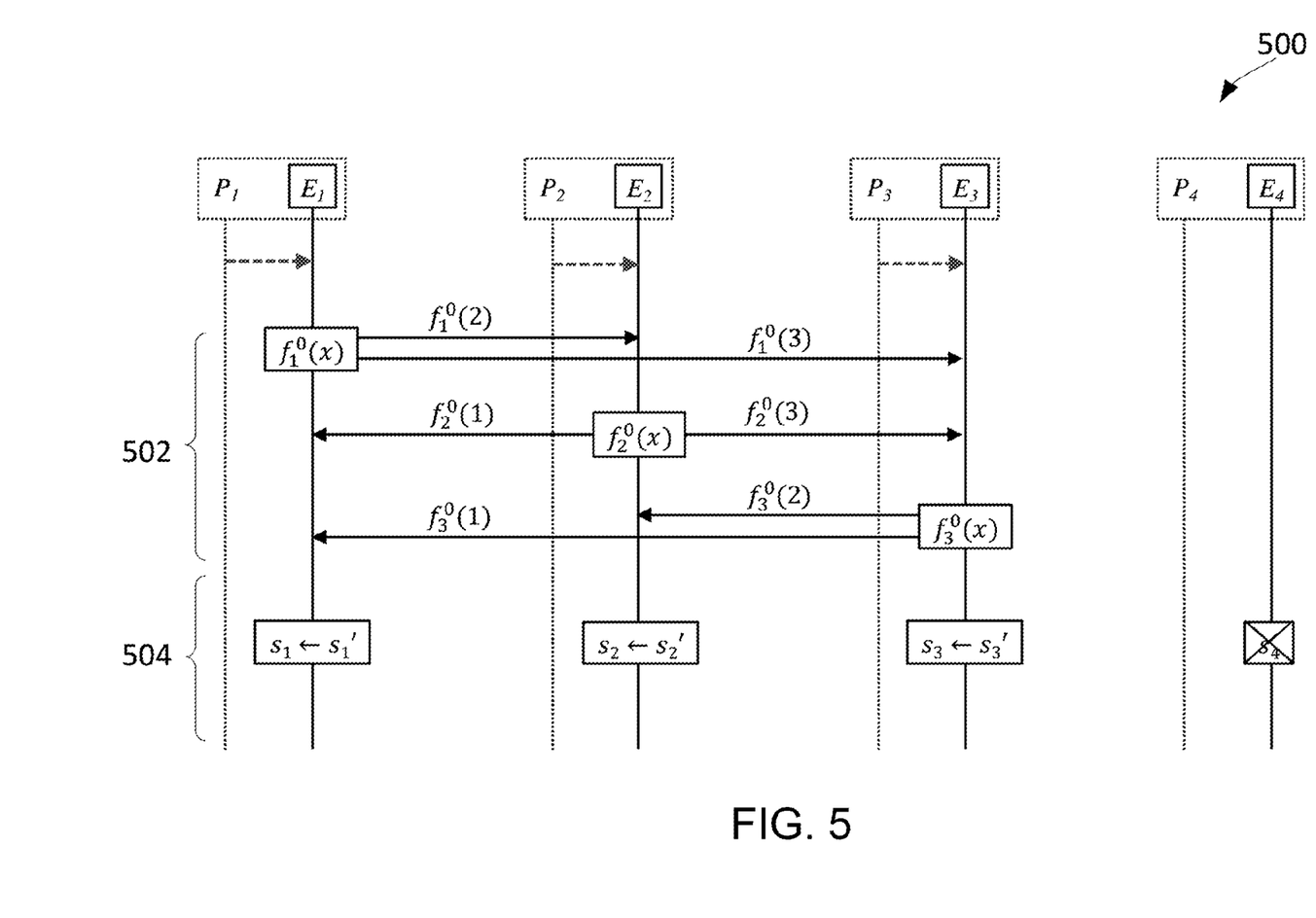
FIG. 5 is a signal diagram of a method of disenrolling a member of a group.

Group members may occasionally be disenrolled from a group. Disenrolling, as used herein, refers to the releasing or removal of a member from membership in a group. Such disenrollment may occur at the request of the member being disenrolled or at the request of other members (e.g., if the member to be disenrolled has not participated in group activities in accordance with defined standards). Referring now to FIG. 5, an example method 500 of disenrolling a member is illustrated. The method may be performed by a node 102 in cooperation with other nodes 102 of the group. The method may be used to disenroll a member without modifying a group public key. Thus, the invention provides an improved, cryptographically secure method which provides enhanced control over a resource compared to what has been previously possible within the prior art.

In order to effect disenrollment, a threshold, n−1, of existing group members cooperate to perform the method 500 of FIG. 5. More particularly, all group members that are to remain in the group take part in the method 500 of FIG. 5. The group member that is to be disenrolled does not, however, take part in the method. In some instances, more than one group member may be disenrolled at a time as long as the number of disenrollments, $d_n$, is less than or equal to the difference between the number of existing group members and the threshold for the threshold signature scheme i.e., $d_n \leq n-(t+1)$.

That is, the number of group members that are not leaving the group must be at least equal to the threshold, t+1, for the threshold signature scheme.

In the example of FIG. 5, the existing group of four members will be modified to exclude one of the participants, $P_4$, so that only three group members remain.

Prior to performance of the method 500 of FIG. 5, participants $P_i$ (i=1, ..., n−1) communicate with one another to signal consensus to revoke the share of a group participant, $P_n$, and form a disenrollment group, $U_D$. Remote attestation may be employed to ensure all the enclaves of the disenrollment group, $U_D$, are operating an approved disenrollment instruction set. More particularly, each member of the disenrollment group confirms that other members of the disenrollment group are operating the approved disenrollment instruction set.

At operation 502, each participant, $P_i$, in the disenrollment group, $U_D$, performs polynomial generation and sharing. More particularly, each participant, $P_i$, in the disenrollment group, $U_D$, provisions their enclave $E_i$ to generate a random degree t polynomial $f_i^0(x)$ with $a_0 = f_i^0(0) = 0$.

At operation 502, each enclave, $E_i$ (i=1, ..., n−1), then securely sends each point j on its new random polynomial, $f_i^0(j)$, to each other enclave $E_j$ (j=1, ..., n−1). Each of the enclaves authenticates the other of the enclaves with remote attestation.

At operation 504, each enclave, $E_i$ (i=1, ..., n−1), generates a new secret share. More particularly, each enclave, $E_i$, then adds all the received points $f_j'(i)$ (j=1, ..., n−1 j|j≠i) to its original secret share, $s_i$, to determine a new secret share, $s_i'$. For example, the new secret share may be determined as:

$$s_i' = s_i + \sum_{j=1, j \neq i}^{n-1} f_j'(i)$$

As an additional confirmation step, operation 308 of the method 300 may be performed after operation 504 of the method 500 to generate the group public key. The participants may then confirm that the group public key has not changed from its previous value (i.e., the value before the method 500 of FIG. 5 was performed).

At operation 504, the previous secret share may be overwritten with the new secret share, effectively invalidating the secret share in the enclave of the participant to be disenrolled, $P_n$. Thus, the member is now disenrolled from the group.

Notably, during the disenrollment method 500, the security of the scheme is only reliant on n−t participants verifiably overwriting their expired key shares with new values. Therefore, a threshold of t+1 enclaves would need to be breached to impact security. Even if the disenrolled participant (who now has nothing to lose) may be able to breach their own enclave to recover their key share, as long as at least n−t enclaves are operating correctly then that share is of no use in collusion attacks.

Signature Generation

The secret shares held by members of a group may be used to allow a valid ECDSA signature to be generated for a transaction. More particularly, at least a threshold number of secret shares may be used to allow group participants to generate a valid signature. The signature may be applied to a transaction that spends digital assets that were previously encumbered by the group public key. That is, the valid signature removes the encumbrance previously placed on the resource(s). The ECDSA signature includes two components—a first component, r, and a second component, w.

Figure 6:
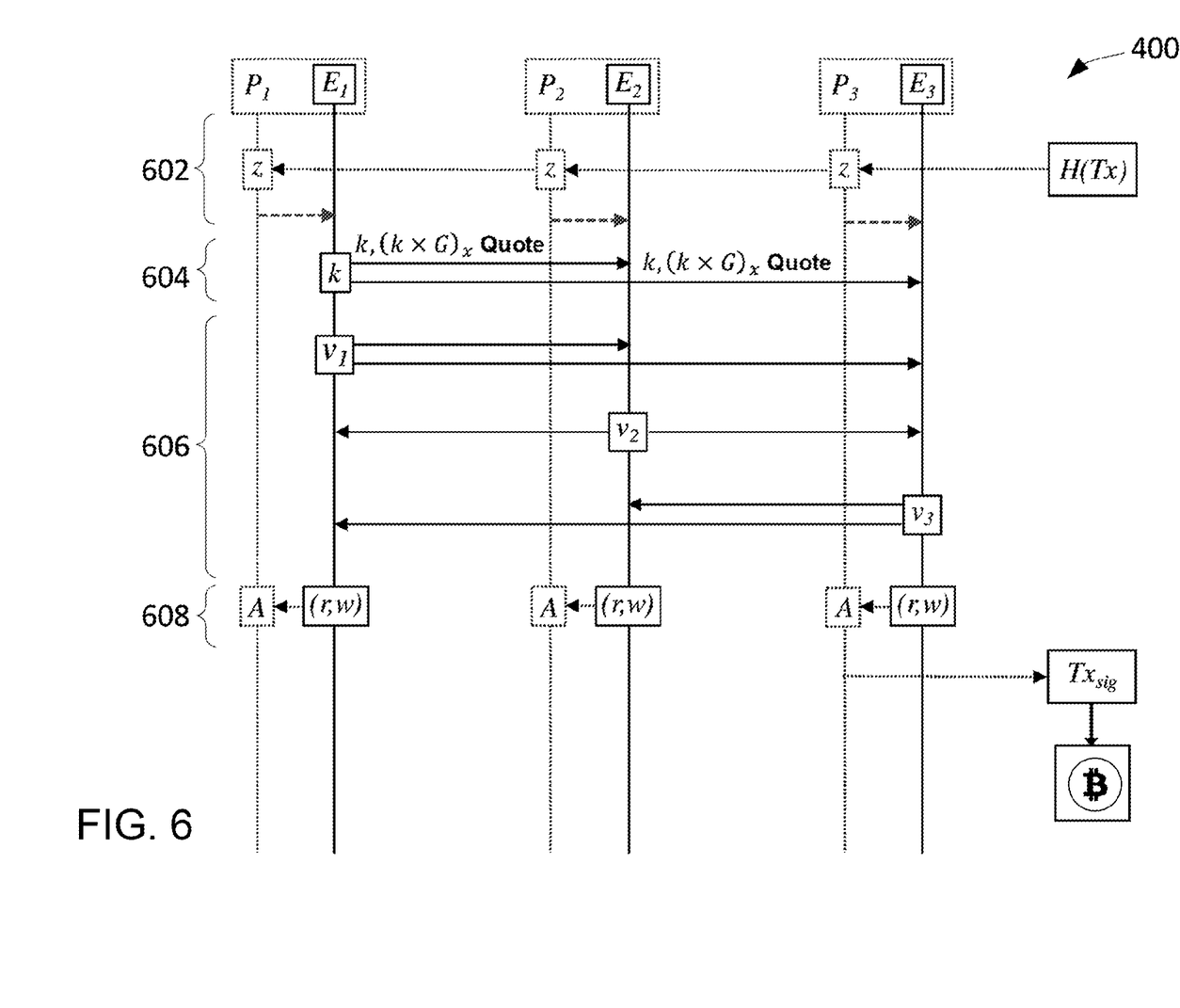
FIG. 6 is a signal diagram of a method of generating a signature for a group.

Referring now to FIG. 6, an example method 600 of generating an ECDSA signature is illustrated. The method 600 may be performed by nodes 102 in cooperation with other nodes 102 of a previously-formed group. The members of the group (i.e., the nodes that cooperatively perform the method 600) may have been previously defined using the techniques described above.

Prior to the method being performed, a plurality of participants (i.e., members) in a group may signal to other participants that they wish to participate in a distributed signature generation to authorize a particular transaction, Tx. That is, nodes may signal an intention to participate in distributed signature generation for the transaction, Tx. The transaction, Tx, is a transaction that would spend outputs encumbered by the group public key. That is, the effect of the transaction would be to remove an encumbrance that is based on the group public key from outputs. The transaction, Tx, may be proposed by one of the participants of the group, for example.

Once a threshold of participants have signalled an intention to participate, a signing group is formed by a node in cooperation with other nodes. In the illustrated example, the signing group includes three participants (i.e., three nodes). However, the signing group could include a different number of nodes.

At operation 602, the nodes that form the signing group determine a hash, z, for the transaction, Tx. The hash is determined as: z=H(Tx), where H represents the hashing function. The hash is determined by consensus of the signing group. For example, the hash may be proposed by one of the participants of the signing group and other members may confirm their agreement with the hash.

At operation 604, the nodes that form the signing group obtain, based on a secure random number, k: a) a multiplicative inverse, $k^{-1}$, of the secure random number; and b) the first signature component, r. The first signature component, r, is determined based on the secure random number k and an elliptic curve generator point, G. More particularly, at operation 604, one of the participants, for example $P_1$, provisions their enclave $E_1$ (which is associated with a trusted execution environment of the node that is the participant $P_1$) to generate a secure random number, k, and calculates the multiplicative inverse, $k^{-1}$, of this secure random number and also calculates the first signature component, r. The first signature component, r, may be determined as:

$$r = (k \times G)_x \bmod p$$

At operation 604, the enclave $E_1$ that calculated the multiplicative inverse, $k^{-1}$, of this secure random number and the first signature component, r, sends these values (e.g., the multiplicative inverse, $k^{-1}$, of this secure random number and the first signature component, r) to enclaves $E_2, \ldots, E_{t+1}$ associated with other participants in the signing group. The enclave $E_1$ that sends these values remotely attests to their integrity and that they have been generated using an approved instruction set. The enclaves $E_2, \ldots, E_{t+1}$ that did not generate these values receive them from the enclave $E_1$ that did generate these values and confirm the integrity of the values (e.g., by confirming that the instruction set used to generate these values is the approved instruction set).

At operation 606, each node of the signing group determines a partial signature, $v_i$, based on a private secret share, the multiplicative inverse of the secure random number and the first signature component. The partial signature, $v_i$, is generated within the enclave of each node. For example, the enclaves $E_i$ (i=1, ..., t+1) for the signing group calculate the partial signature as:

$$v_i = k^{-1} r b_i s_i \bmod p,$$

where $b_i$ is a Lagrangian interpolation coefficient determined as $$b_i = \prod_{j \in U, j \neq i} \frac{i}{j-i},$$

$k^{-1}$ is the multiplicative inverse of the secure random number, $s_i$ is the secret share for participant $P_i$ (which has been previously obtained using a technique described above), r is the first signature component, and p is the order.

Thus, the determining of a partial signature may involve performing lagrangian interpolation.

At operation 606, each of the enclaves $E_i$ (i=1, ..., t+1) for the signing group securely broadcast their partial signature, $v_i$, to the other enclaves for the signing group so that each node (and, more specifically, each enclave) receives partial signatures from the other nodes of the signing group.

At operation 608, each node of the signing group (and, more specifically, each enclave) may generate the second signature component, w, based on the partial signatures determined and received at operation 606. For example, the second signature component may be determined as:

$$w = k^{-1} z + \sum_{i=1}^{t+1} v_i,$$

where z is the transaction hash.

At operation 608, each node of the signing group may send the ECDSA signature, including the first signature component and the second signature component, from its enclave to a host portion of the node (i.e., a portion of the node that is not the enclave) and the node may verify the signature against the transaction hash, z, and the group public key, A.

Any participant in the signing group may then add the signature to the corresponding transaction and broadcast it to the blockchain network.

The security of the signature scheme described above is dependent on the value of the ephemeral private key which is the secure random number, k, which is generated by one enclave and secretly distributed to the other enclaves in the signing group, remaining hidden. If this value were to be extracted by breaching just one of the enclaves, the shared private key can be determined from the signature of the transaction, and could then be used to sign a completely different transaction. The impact of this is, however, minimal, since a physical breach of an enclave must occur within a very small time window: the confirmation time of the transaction on the blockchain.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented security method comprising the step of:
   generating an elliptic curve digital signature algorithm signature comprising a first signature component, r, and a second signature component, w, wherein generating comprises:
   forming, by a node, a signing group with other nodes;
   obtaining, by the node, based on a secure random number:
      a) a multiplicative inverse of the secure random number; and
      b) the first signature component, r, wherein the first signature component is determined based on the secure random number and an elliptic curve generator point, wherein obtaining comprises generating the multiplicative inverse and the first signature component and provisioning an enclave associated with a trusted execution environment of the node to generate the secure random number;
   generating the secure random number using the enclave;
   determining, by the enclave, a partial signature based on a private secret share, the multiplicative inverse of the secure random number and the first signature component, wherein the enclave is configured to provide an attestation to prove the partial signature is being generated correctly;
   receiving, by the node, partial signatures from other nodes of the signing group;
   generating, by the node, the second signature component, w, based on determined and received partial signatures, wherein the second signature component is generated based on a threshold signature scheme using a threshold number of received partial signatures; and
   sending the multiplicative inverse to the other nodes.

2. The computer-implemented method according to claim 1, wherein obtaining comprises receiving the multiplicative inverse and the first signature component from one of the other nodes.

3. The computer-implemented method according to claim 1, further comprising, prior to forming the signing group, signalling an intention to participate in distributed signature generation.

4. The computer-implemented method according to claim 1, wherein the partial signature is determined by performing Lagrangian interpolation.

5. The computer-implemented method according to claim 1, wherein the second signature component is generated within an enclave associated with a trusted execution environment and wherein the method further includes, after generating the second signature component, sending the elliptic curve digital signature algorithm from the enclave to a host portion of the node.

6. The computer-implemented method according to claim 1, further comprising adding the signature to a transaction and broadcasting the transaction to a blockchain network.

7. The computer-implemented method according to claim 1, further comprising, prior to forming the signing group, obtaining the secret share by based on secret share data received from a plurality of existing members of the signing group.

8. The computer-implemented method according to claim 7, wherein the secret share is determined within an enclave associated with a trusted execution environment of the node.

9. The computer-implemented method according to claim 1, wherein the partial signature, $v_i$, is determined as:

$$v_i = k^{-1} r b_i s_i \bmod p,$$

where $b_i$ is a Lagrangian interpolation coefficient, $k^{-1}$ is the multiplicative inverse of the secure random number, $s_i$ is the secret share, r is the first signature component, and p is an order.

10. A computer readable storage medium storing computer-executable instructions which, when executed, configure a processor to:
  form, by a node, a signing group with other nodes;
  obtain, by the node, based on a secure random number:
    a) a multiplicative inverse of the secure random number; and
    b) a first signature component, r, wherein the first signature component is determined based on the secure random number and an elliptic curve generator point, wherein obtaining comprises:
      generating the multiplicative inverse and the first signature component and send the multiplicative inverse to the other nodes; and
      provisioning an enclave associated with a trusted execution environment of the node to generate the secure random number;
  generate the secure random number using the enclave;
  determine, by the enclave, a partial signature based on a private secret share, the multiplicative inverse of the secure random number and the first signature component, wherein the enclave is configured to provide an attestation to prove the partial signature is being generated correctly;
  receive, by the node, partial signatures from other nodes of the signing group;
  generate, by the node, a second signature component, w, based on determined and received partial signatures, wherein the second signature component is generated based on a threshold signature scheme using a threshold number of received partial signatures; and
  generate an elliptic curve digital signature algorithm signature based on the first signature component, r, and the second signature component, w.

11. An electronic device comprising:
  an interface device;
  a processor coupled to the interface device; and
  a memory coupled to the processor, the memory having stored thereon computer executable instructions that, when executed, cause the processor to:
    generate an elliptic curve digital signature algorithm signature comprising a first signature component, r, and a second signature component, w, wherein generating comprises:
      forming, by a node, a signing group with other nodes;
      obtaining, by the node, based on a secure random number:
        a) a multiplicative inverse of the secure random number;
        b) the first signature component, r, wherein the first signature component is determined based on the secure random number and an elliptic curve generator point; and
        wherein obtaining comprises generating the multiplicative inverse and the first signature component, and provisioning an enclave associated with a trusted execution environment of the node to generate the secure random number;
      generating the secure random number using the enclave;
      determining, by the enclave, a partial signature based on a private secret share, the multiplicative inverse of the secure random number and the first signature component, wherein the enclave is configured to provide an attestation to prove the partial signature is being generated correctly;
      receiving, by the node, partial signatures from other nodes of the signing group;
      generating, by the node, the second signature component, w, based on determined and received partial signatures, wherein the second signature component is generated based on a threshold signature scheme using a threshold number of received partial signatures; and
      sending the multiplicative inverse to the other nodes.

12. The electronic device of claim 11, wherein the processor includes a trusted execution environment and wherein the computer executable instructions are executed within the trusted execution environment.

* * * * *